United States Patent
Durkheim

(10) Patent No.: US 8,970,201 B2
(45) Date of Patent: Mar. 3, 2015

(54) GEOCOMPOSITE ENABLING LEAK DETECTION BY ELECTRICAL SCAN, AND METHOD FOR USE

(75) Inventor: Yves Durkheim, Chartres (FR)

(73) Assignee: Afitex International, Chartres (FR)

( * ) Notice: Subject to any disclaimer, the term of this patent is extended or adjusted under 35 U.S.C. 154(b) by 274 days.

(21) Appl. No.: 13/575,468

(22) PCT Filed: Jan. 27, 2011

(86) PCT No.: PCT/FR2011/050161
§ 371 (c)(1),
(2), (4) Date: Aug. 28, 2012

(87) PCT Pub. No.: WO2011/092433
PCT Pub. Date: Aug. 4, 2011

(65) Prior Publication Data
US 2012/0313617 A1 Dec. 13, 2012

(30) Foreign Application Priority Data
Jan. 27, 2010 (FR) ...................... 10 50548

(51) Int. Cl.
*G01N 27/00* (2006.01)
*G01M 3/40* (2006.01)
*E02D 31/00* (2006.01)

(52) U.S. Cl.
CPC ............. *G01M 3/40* (2013.01); *E02D 31/004* (2013.01)
USPC ..................................... 324/71.1

(58) Field of Classification Search
CPC .............. E02D 2450/10; E02D 2300/0085; E02D 2300/0004; E02D 31/004; G01M 3/40
See application file for complete search history.

(56) References Cited

U.S. PATENT DOCUMENTS

| 5,850,144 A | 12/1998 | Howells et al. | |
| 2011/0252758 A1* | 10/2011 | Babcock et al. | 55/486 |
| 2014/0054085 A1* | 2/2014 | Vermeulen et al. | 174/70 R |

FOREIGN PATENT DOCUMENTS

| EP | 0584469 A1 | 3/1994 |
| EP | 1614812 A1 | 1/2006 |
| JP | 10 153516 | 6/1998 |
| WO | 00/01895 | 1/2000 |

OTHER PUBLICATIONS

Laine et al., "Detecting Leaks in Geomembranes," Civil Engineering—ASCE, vol. 63, No. 8, pp. 50-53.

* cited by examiner

*Primary Examiner* — Tung X Nguyen
(74) *Attorney, Agent, or Firm* — Lowe Hauptman & Ham, LLP

(57) ABSTRACT

A geocomposite for positioning under a geomembrane comprising at least one first geotextile covered by at least one second geotextile at least one electrically conductive textile being positioned between the second geotextile and the first geotextile. The conductive textile having a module for connecting to a phase of an electric generator. The geocomposite being in the form of one or several strips at the edges of which the second geotextile, the first geotextile and the electrically conductive textile are separate from each other, the geocomposite comprising perforated ringed mini-drains positioned parallel with each other on the first geotextile and covered with the second geotextile.

16 Claims, 4 Drawing Sheets

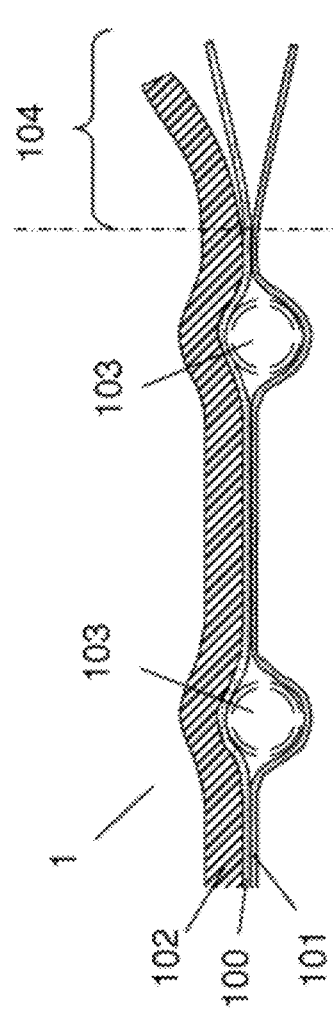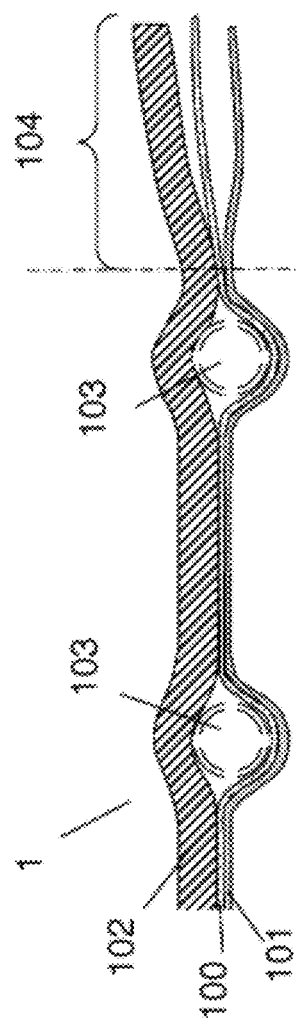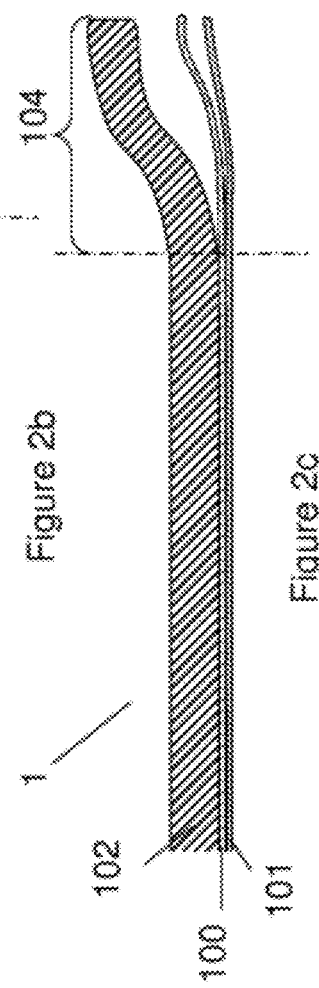

GEOCOMPOSITE ENABLING LEAK DETECTION BY ELECTRICAL SCAN, AND METHOD FOR USE

RELATED APPLICATIONS

The present application is based on, and claims priority from, France Application Number PCT/FR2011/050161, filed Jan. 27, 2010, the disclosure of which is hereby incorporated by reference herein in its entirety.

FIELD

The present invention relates to the field of geocomposites. The present invention more particularly proposes a geocomposite range and an electric scan with which leaks may be detected.

BACKGROUND

For building leakproof structures such as retention dikes or waste storage bins dug in a ground for example, it is necessary to ensure a sufficient seal in order to avoid for example a leak of fluids contained in the leakproof structure. A fluid leak may actually contaminate or pollute the ground.

In order to obtain a sufficient seal of the leakproof structure, geomembranes generally made for example in polyethylene or in polyvinyl are known from the prior art. Now, as a result of a poor workmanship by wear or by poor use of the geomembrane, deteriorations or holes may appear through the geomembrane thereby causing leaks. Further, the geomembrane because of its seal does not allow the discharge of gases or liquids which may stagnate or accumulate between it and the ground through a not very efficient draining web.

Document WO 00/01895 describes a geomembrane comprising a conductive layer sandwiched between two non-conductive layers. This conductive layer is laid out so as to conduct electricity and to allow detection of holes in the geomembrane by establishing a potential difference between one probe on one side of the geomembrane and the conductive layer. With this solution, it is not possible to obtain mechanical protection of the geomembrane allowing an extension of the lifetime of the geomembrane.

In the same way, document U.S. Pat. No. 5,850,144 teaches a geomembrane consisting of a metal wire-mesh between two insulating polymeric resin layers. When this geomembrane is installed, the possible holes may be detected by an electric potential applied between the metal wire-mesh and a probe. In the same way as in the preceding document, this solution does not allow mechanical protection of the geomembrane to be obtained.

Document JP 10 153516 teaches a geocomposite consisting of a conductive layer between two geotextiles. This geocomposite is intended to be positioned under a geomembrane in order to allow detections of leaks of the geomembrane. The conductive layer consists in a plate or a metal wire-mesh. This solution takes away flexibility from the geocomposite, required during its installation, and does not allow sufficient connecting contact to be obtained between the different layers of the geocomposite.

BRIEF SUMMARY

The object of the present invention is therefore to overcome one or more of the drawbacks of the prior art by defining a geocomposite placed between the geomembrane and the ground allowing detection of holes in the geomembrane, the mechanical protection of the geomembrane, the optional drainage of the liquids and gases accumulating under the geomembrane and the filtration of earth particles to avoid clogging of the draining web.

For this purpose, the invention relates to a geocomposite comprising at least one first geotextile covered with at least one second geotextile characterized in that at least one electrically conductive textile is positioned between the second geotextile and the first geotextile, the conductive textile further having a module for connecting to a phase of an electric generator and in that the geocomposite appears in the form of one of more strips at the edges of which the second geotextile, the first geotextile and the electrically conductive textile are separate from each other.

According to another particularity, the geocomposite further comprises perforated ringed mini-drains parallel with each other, positioned on the first geotextile and covered with the second geotextile.

According to another particularity, the electrically conductive textile is positioned under the mini-drains.

According to another particularity, the electrically conductive textile is positioned on the mini-drains.

According to another particularity, the first geotextile is a filtering web.

According to another particularity, the second geotextile is a draining web.

According to another particularity, the electrically conductive textile is composed of of polyethylene threads with an entanglement in which stainless steel wires are inserted.

According to another particularity, assembling of the first and second geotextiles and of the electrically conductive textile is carried out by needlepunching without deteriorating the arrangement of the stainless steel wires.

According to another particularity, assembling of the first and second geotextiles, of the electrically conductive textile, and of the mini-drains is carried out by needlepunching without deteriorating the arrangement of the stainless steel wires.

An additional object of the present invention is to propose an installation method for a leakproof structure of a geocomposite comprising at least one first geotextile, covered with at least one second geotextile, and an electrically conductive textile positioned between the second geotextile and the first geotextile, further having a module for connecting to a phase of an electric generator, the geocomposite being shown in the form of one or several strips at the edges of which the second geotextile, the first geotextile and the electrically conductive textile are separate from each other, a method characterized in that it comprises at least the following steps, these steps being reproducible until the required dimensions for the leakproof structure are obtained:

- a step for positioning a first strip of geocomposite at the bottom of the leakproof structure;
- a step for positioning a second strip so that overlapping exists between the first strip and the second strip at the edge of the strip at the bottom of the leakproof structure;
- a step for positioning the second geotextile of both strips, of the first geotextile of both strips and of the electrically conductive textile of both strips so as to guarantee continuity of conductivity of the electrically conductive textile of the first strip and the electrically conductive textile of the second strip.

An additional object of the present invention is to propose an electric scan operating with a geocomposite which comprises at least one first geotextile covered with at least one second geotextile, and an electrically conductive textile positioned between the second geotextile and the first geotextile, which further has a module for connecting to a phase of an electric generator, the geocomposite being shown in the shape of one or several strips at the edges of which the second geotextile, the first geotextile and the electrically conductive textile are separate from each other, characterized in that the scan is connectable to another phase of the electric generator.

An additional object of the present invention is to propose a method for detecting a leak in a geomembrane by means of an electric scan connectable to a phase of an electric generator and a geocomposite comprising at least one first geotextile covered by at least one second geotextile, and an electrically conductive textile positioned between the second geotextile and the first geotextile, further having a module for connecting to another phase of the electric generator, the geocomposite being shown in the shape of one or several strips, at the edges of which the second geotextile, the first geotextile and the electrically conductive textile are separate from each other, the method being characterized in that it includes at least the following steps:

- a step for connecting the electric scan to a phase of the electric generator;
- a step for connecting the electrically conductive textile to another phase of the electricity generator by means of the connection module;
- a step for passing the electric scan above the surface of the geomembrane until a passage of an electric current between the conductive textile and the electric scan through a hole through the geomembrane is detected by the occurrence of a spark or indicated by a display means of the electric generator or of the electric scan connected to the electric generator.

According to another particularity, the step for connecting the electric scan to a phase of the electric generator precedes the step for connecting the electrically conductive textile to another phase of the electric generator by means of the connection module.

According to another particularity, the step for connecting the electric scan to a phase of the electric generator follows the step for connecting the electrically conductive textile to another phase of the electricity generator by means of the connection module.

According to another particularity, the step for passing an electric scan above the surface of the geomembrane consists in locating holes in the geomembrane, each hole causing the occurrence of a spark by the passing of an electric current between the conductive textile and the electric scan.

According to another particularity, the step for passing an electric scan above the surface of the geomembrane is followed by a step for repairing the hole or changing the whole geomembrane or a portion of the latter.

An additional object of the present invention is to propose a system for detecting leaks characterized in that it consists of at least:
- one geocomposite comprising at least one first geotextile covered by at least one second geotextile and at least one electrically conductive textile positioned between the second geotextile and the first geotextile, the conductive textile further having a module for connecting to a phase of electric generator, the geotextile being shown in the form of one or several strips, at the edges of which the second geotextile, the first geotextile and the electrically conductive textile are separate from each other;
- an electric scan connectable to another phase of the electric generator.

BRIEF DESCRIPTION OF THE DRAWINGS

Other particularities and advantages of the present invention will become more clearly apparent upon reading the description hereafter, made with reference to the appended drawings:

FIG. 2a illustrates a sectional view of the geocomposite along a plane perpendicular to the mini-drains according to one configuration;

FIG. 2b illustrates a sectional view of the geocomposite along a plane perpendicular to the mini-drains according to another configuration;

FIG. 2c illustrates a sectional view of the geocomposite along a perpendicular plane with respect to the geotextiles according to another configuration;

DETAILED DESCRIPTION

Figure 1:
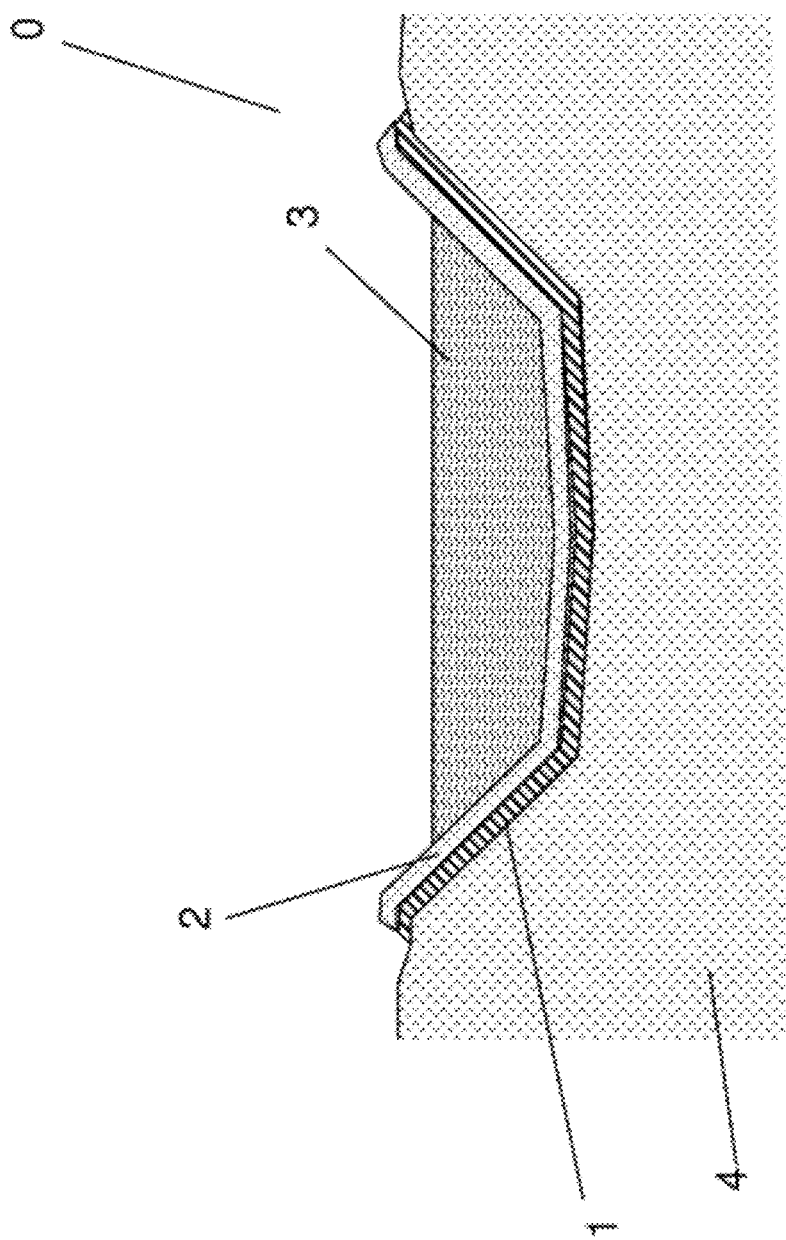
FIG. 1 illustrates a sectional view of a leakproof structure using the geocomposite according to the invention.

With reference to FIG. 1, a leakproof structure (0) requires that a sufficient seal be ensured in order to avoid for example a leak of the fluids (3) contained in the leakproof structure (0). A fluid leak (3) may actually contaminate or pollute the ground (4). The use of a geomembrane (2) is known from the prior art. The geomembrane (2) is used for ensuring the required seal. Now, leaks may occur in the geomembrane (2).

The invention relates to a geocomposite (1) positioned under the geomembrane (2) with which it is possible to monitor the leakproof structure (0) and to detect leaks.

According to a first configuration illustrated in FIG. 2c, the geocomposite (1) comprising a first geotextile (101) covered by a second geotextile (102). At least one electrically conductive textile (100) is positioned between the second geotextile (101) and the first geotextile (102).

Figure 3:
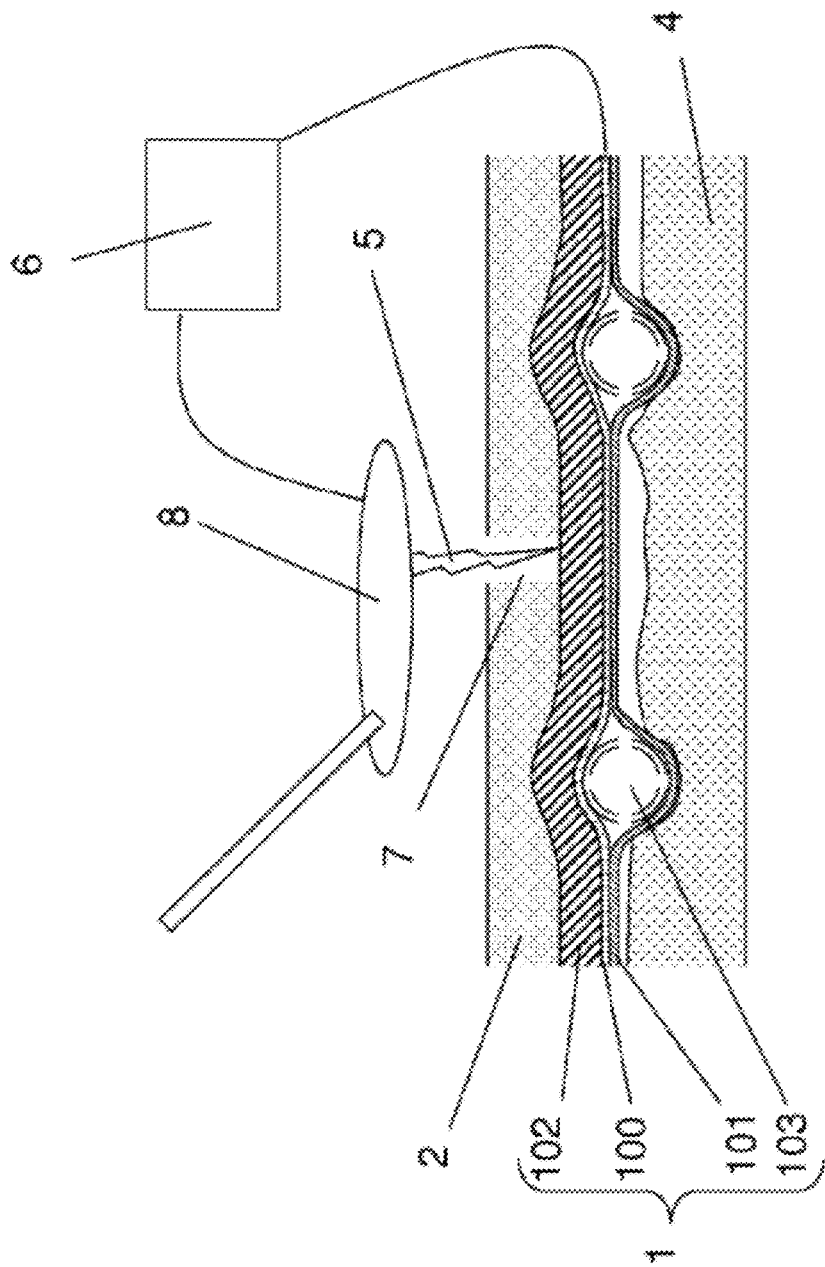
FIG. 3 illustrates the geocomposite and the electric scan according to a configuration with occurrence of a spark.

With reference to FIGS. 2a, 2b and 3, the invention teaches according to a second configuration, a geocomposite (1) which comprises a first geotextile (101). On this first geotextile (101) are positioned perforated ringed mini-drains (103) parallel with each other and at least one second geotextile (102) covering the perforated ringed mini-drains (103).

The first geotextile (101) may in a non-limiting way be a filtering web allowing filtration of the earth particles of the ground (4) in order to avoid clogging of the second geotextile (102).

The second geotextile may in a non-limiting way be a draining web allowing draining of waters and gases circulating under the geomembrane (2). This drainage is also possible upon a leak through holes or cracks in the geomembrane (2).

At least one electrically conductive textile (100) is positioned between the second geotextile (102) and the first geotextile (101).

For at least the first and second configurations, a connection module not shown is provided in order to connect the electrically conductive textile (100) to a phase of an electric generator (6).

According to a configuration illustrated in FIG. 2b, the electrically conductive textile (100) is positioned under the mini-drains (103).

According to another configuration illustrated in FIG. 2a, the electrically conductive textile (100) is positioned on the mini-drains (103).

The first geotextile (101) and the second geotextile (102) are preferably non-woven.

The electrically conductive textile (100) for example includes synthetic or artificial threads which are not electrically conductive, such as for example polyethylene, polypropylene, polyester or polyamide, and electrically conductive wires such as for example in copper, stainless steel or galvanized steel. The wires are for example woven, knitted or non-woven or entangled with each other. This conductive textile (100) allows the geotextile to retain the flexibility required during installation of the one for the leakproof structure and also required for good mechanical protection while retaining draining and/or filtering properties of the geocomposite. Such a structure of the conductive textile (100) also ensures a reinforcement of the ground (4) on which is laid the conductive textile (100), or of the geomembrane (2). Actually, for example, if the ground (4) on which is laid the conductive textile (100) will collapse, the conductive textiles (100) may retain the geomembrane (2) laid on the conductive textile (100). Thus, the geomembrane (2) does not undergo tractions generated by the collapse of the ground (4) and the fluids contained for example in the leakproof structure (0), these tractions may cause deterioration of the geomembrane (2).

For example, the electrically conductive textile (100) may in a non-limiting way consist of polyethylene threads with an entanglement, a weave or a knit into which stainless steel wires are inserted.

The first (101) and second (102) geotextiles, the electrically conductive textile (100) and the mini-drains (103) are assembled by needlepunching without deteriorating the arrangement of the conductive wires of the electrically conductive textiles (100). By this assembling method, the fibers of the geotextiles (101; 102) and the conductive wires and/or non-conductive threads of the electrically conductive textile (100) are entangled so as to allow optimum connection between the different layers of the geocomposite.

The geocomposite may be shown in the form of one or several strips. The first (101) and second (102) geotextiles and the electrically conductive textile (100) are not assembled at the edges (104) of the strip(s); they are separate from each other. This allows nesting of adjacent strips so that there exists a continuity of the conductivity of the conductive textile (100) of each strip.

The diameter of the conductive wires, for example in stainless steel, is parameterized so as not to deteriorate the geomembrane (2). A too large diameter risks deforming the geomembrane (2) and therefore damaging it. A too small diameter risks making the wires of the electrically conductive textile (100) fragile, which will then become inefficient. The diameter of the conductive wires such as those in stainless steel may in a non-limiting way be of a diameter comprised between 0.1 mm to 1 mm, preferentially 0.1 mm.

With the geocomposite (1) it is also possible to obtain mechanical protection of the geomembrane (2) with respect to the ground (4).

Figure 4:
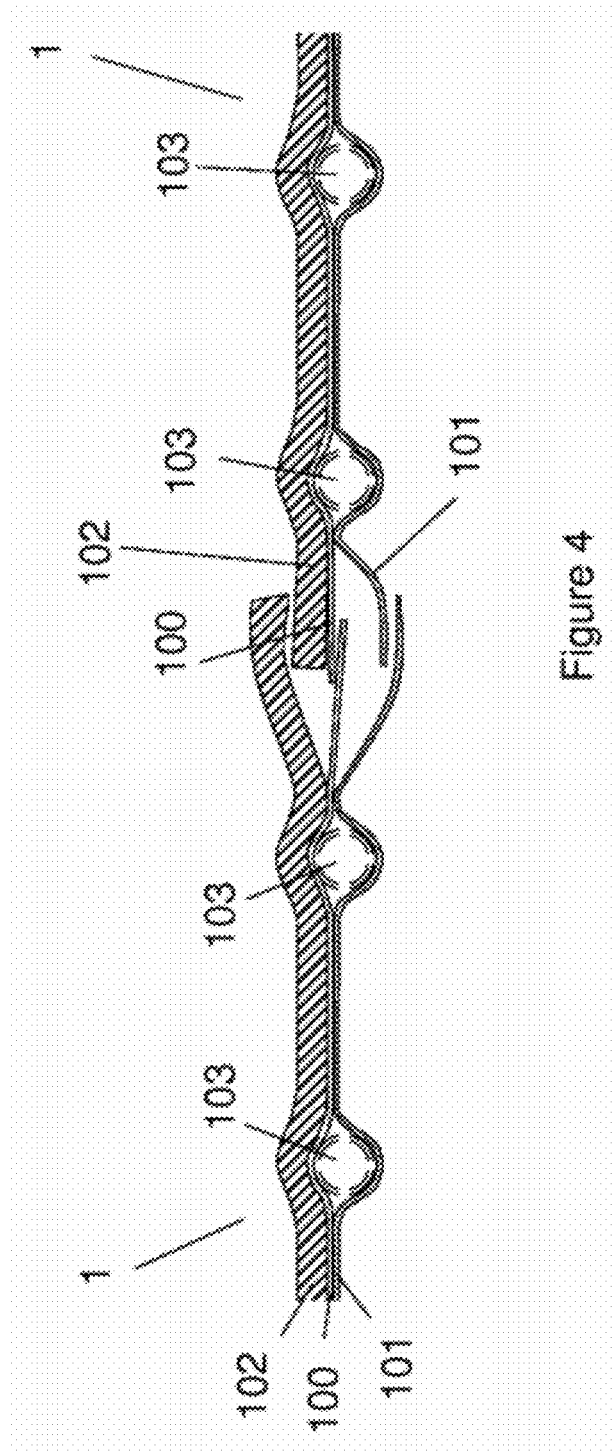
FIG. 4 illustrates two adjacent strips of geocomposite.

FIGS. 4 and 5 illustrate the geocomposite (1) according to a configuration with the mini-drains (103). But it should be understood that other configurations with or without mini-drains (103) are also possible.

An additional object of the present invention is to propose an electric scan (8). This electric scan (8) operates by co-operating with the electrically conductive textile (100) of the geocomposite (1). It is connectable to another phase of the electric generator (6) to which the electrically conductive textile (100) is connected.

The geocomposite (1) and the electric scan (8) form a system allowing application of a method for detecting a leak in a geomembrane (2).

In a first phase, an installation procedure, an additional object of the present invention, is required. Upon building the leakproof structure (0), the geocomposite (1) is installed, depending on the type of structure (0), at the bottom of the structure (0) in a hole dug in the ground (4) for covering the whole dug portion.

The geocomposite may be shown in the shape of strips. The second geotextile (102), the first geotextile (101), and the conductive textile (100) are then separate from each other at the edges (104) of the strips. This allows application of the method.

With reference to FIG. 4, a first strip is positioned at the bottom of the leakproof structure (0). A second strip is positioned beside the first strip so that overlapping exists between the first and the second strip at the edges (104) of each strip.

Thus, in a configuration, the edge of the first geotextiles (101) of the first strip is underneath the adjacent edge of the conductive textile (100) of the second strip. The edge of the second geotextile (102) of the first strip is above the adjacent edge of the conductive textile (100) of the second strip. The positioning of the edge of the second geotextile (102) and of the edge of the first geotextile (101) of the first strip with respect to the adjacent edge of the second geotextile (102) and to the adjacent edge of the first geotextile (101) of the second strip respectively may be selected depending on the needs of the leakproof structure (0). However, it is necessary that the edges (104) of the conductive textiles (100) of the first and second strips be in contact. The following strips also have to keep this electric continuity by overlapping of at least the conductive textiles (100) of each strip.

The number of strips is selected according to needs and to the size of the leakproof structure (0).

Thus, the adjacent strips have to be nested with each other in order to keep this electricity conduction continuity of the conductive textiles (100) for the whole of the geocomposite (1).

The geomembrane (2) ensuring the seal of the leakproof structure (0) is then positioned on the thereby installed geocomposite (1).

It is possible to superpose several geocomposites of the same configuration or of different configurations. For example, it is possible to position a geocomposite (1) according to a configuration without any mini-drain (103) on a geocomposite (1) according to a configuration with mini-drains (103) or vice versa.

Another object of the invention is a method for detecting a leak which includes at least the following steps:

a step for connecting the electric scan (8) to a phase of the electricity generator (6), and then a step for connecting the electrically conductive textile (100) to another phase of the electricity generator (6). Both of these steps may be inverted.

In a following step, the electric scan (8) is passed above the surface of the geomembrane (2). The geomembrane (2) playing the role of an insulator, the electric current does not flow between the electric scan and the electrically conductive textile (100) of the geocomposite (1). Now, when a hole (7) or a crack exists in the geomembrane (2), the electric current may flow between the electric scan (8) and the electrically conductive textile (100) of the geocomposite (1) at the hole (7) or at the crack. If holes (7) or cracks exist in the geomembrane (2), a spark (5) may occur thereby indicating the presence of the hole (7) or of the crack in the geomembrane (2). It is also possible that a display means associated with the electric generator and/or that a display means associated with the electric scan reports the passing of electric current.

At each occurrence of a spark (5) upon passing the electric scan (8), the holes (7) or the cracks are located. It is thus possible to produce a mapping of the holes (7) or cracks of the geomembrane (2) in order to decide which means should applied for its repair.

This repair may consist in blocking the holes (7) or the cracks. It may also consist in total or partial replacement of the geomembrane (2).

The use is preferentially carried out when the leakproof structure is empty.

It should be obvious for the person skilled in the art that the present invention allows embodiments under many other specific forms without departing from the field of application of the invention as claimed. Therefore, the present embodiments should be considered as an illustration, but may be modified in the field defined by the scope of the appended claims, and the invention should not be limited to the details given above.

The invention claimed is:

1. A geocomposite for positioning under a geomembrane comprising at least one first geotextile covered by at least one second geotextile, at least one electrically conductive textile being positioned between the second geotextile and the first geotextile, the conductive textile further having a module for connecting to a phase of an electric generator, the geocomposite being in the form of one or several strips at the edges of which the second geotextile, the first geotextile and the conductive textile are separate from each other, the geocomposite further comprises perforated ringed mini-drains positioned parallel with each other on the first geotextile and covered with the second geotextile.

2. The geocomposite according to claim 1, wherein the electrically conductive textile is positioned under the mini drains.

3. The geocomposite according to claim 1, wherein the electrically conductive textile is positioned on the mini-drains.

4. The geocomposite according to claim 1, wherein the first geotextile is a filtering web.

5. The geocomposite according to claim 1, wherein the second geotextile is a draining web.

6. The geocomposite according to 4 claim 1, wherein the electrically conductive textile includes non-electrically conductive threads and electrically conductive wires, the threads/wires being woven, knitted, non-woven or entangled with each other.

7. The geocomposite according to claim 1, wherein the assembling of the first and second geotextiles and of the electrically conductive textile is carried out by needlepunching without deteriorating the arrangement of the conductive wires.

8. The geocomposite according to claim 1, wherein the assembling of the first and second geotextiles, of the electrically conductive textile and of the mini drains is carried out by needlepunching without deteriorating the arrangement of the conductive wires.

9. A method for installing for a leakproof structure a geocomposite according to claim 1 comprising at least one first geotextile, covered by at least one second geotextile and an electrically conductive textile positioned between the second geotextile and the first geotextile, further having a module for connecting to a phase of an electric generator, the geocomposite further comprising perforated ringed mini-drains positioned parallel with each other on the first geotextile and covered with the second geotextile, the geocomposite being in the form of one or several strips at the edges of which the second geotextile, the first geotextile and the electrically conductive textile are separate from each other, the method comprising at least the following steps, these steps being reproducible until the dimensions required for the leakproof structure are obtained:

a step for positioning a first strip of geocomposite at the bottom of the leakproof structure;

a step for positioning a second strip so that overlapping exists between the first strip and the second strip at the edge of the strip at the bottom of the leakproof structure;

a step for positioning the second geotextile of both strips, the first geotextile of both strips and the electrically conductive textiles of both strips so as to guarantee continuity of conductivity of the electrically conductive textile of the first strip and the electrically conductive textile of the second strip.

10. An electric scan operating with a geocomposite (1) according to claim 1 which comprises at least one first geotextile covered by at least one second geotextile, and an electrically conductive textile positioned between the second geotextile and the first geotextile, which further has a module for connecting to a phase of an electric generator, the geocomposite further comprising perforated ringed mini-drains and positioned parallel with each other on the first geotextile and covered with the second geotextile, the geotextile being shown in the form of one or several strips at the edges of which the second geotextile, the first geotextile and the electrically conductive textile are separate from each other, wherein the scan is connectable to another phase of the electric generator.

11. A method for leak detection in a geomembrane by an electrical scan connectable to a phase of an electric generator and a geocomposite according to claim 1 positioned under the geomembrane comprising at least one first geotextile covered by at least one second geotextile, and an electrically conductive textile positioned between the second geotextile and the first geocomposite further having a module for connecting to another phase of the electric generator, the geocomposite further comprising perforated ringed mini-drains and positioned parallel with each other on the first geotextile and covered with the second geotextile, the geocomposite being shown in the form of one or several strips at the edges of which the second geotextile, the first geotextile and the electrically conductive textile are separate from each other, the method being wherein the method includes at least the following steps:

a step for connecting the electric scan to a phase of the electric generator;

a step for connecting the electrically conductive textile to another phase of the electricity generator by means of the connection module;

a step for passing the electric scan above the surface of the geomembrane until a passing of an electric current between the conductive textiles and the electric scan through a hole or a crack through the geomembrane is detected by the occurrence of a spark or indicated by a display means of the electric generator or of the electric scan connected to the electric generator.

12. The method according to claim 11, wherein the step for connecting the electric scan to a phase of the electric generator precedes the step for connecting the electrically conductive textiles to another phase of the electric generator by means of the connection module.

13. The method according to claim 11 wherein the step for connecting the electric scan to a phase of the electric generator follows the step for connecting the electrically conductive textile to another phase of the electricity generator by means of the connection module.

14. The method according to claim 11, wherein the step for passing an electric scan above the surface of the geomembrane consists in localizing the holes in the geomembrane, each hole causing the occurrence of a spark by the passing of an electric current between the conductive textiles and the electric scan.

15. The method according to claim 11, wherein the step for passing an electric scan above the surface of the geomembrane is followed by a step for repairing the hole or the crack or by a replacement of the whole geomembrane (2) or one portion of the latter.

16. A system for detecting leaks comprising at least:
one geocomposite according to claim 1 comprising at least one first geotextile covered by at least one second geotextile, and at least one electrically conductive textile positioned between the second geotextile and the first geotextile, the conductive textile further having a module for connecting to a phase of an electric generator, the geocomposite further comprising perforated ringed mini-drains positioned parallel with each other on the first geotextile and covered with the second geotextile, the geocomposite being shown in the form of one or several strips at the edges of which the second geotextile, the first geotextile and the electrically conductive textile are separate from each other; and
one electric scan connectable to another phase of the electric generator.

* * * * *